May 8, 1923.

R. H. VISGER

MEASURING DEVICE

Filed Feb. 27, 1922

Inventor
R. H. Visger.
By C. A. Snow & Co.
Attorney

May 8, 1923.
R. H. VISGER
MEASURING DEVICE
Filed Feb. 27, 1922
1,454,354
2 Sheets-Sheet 2
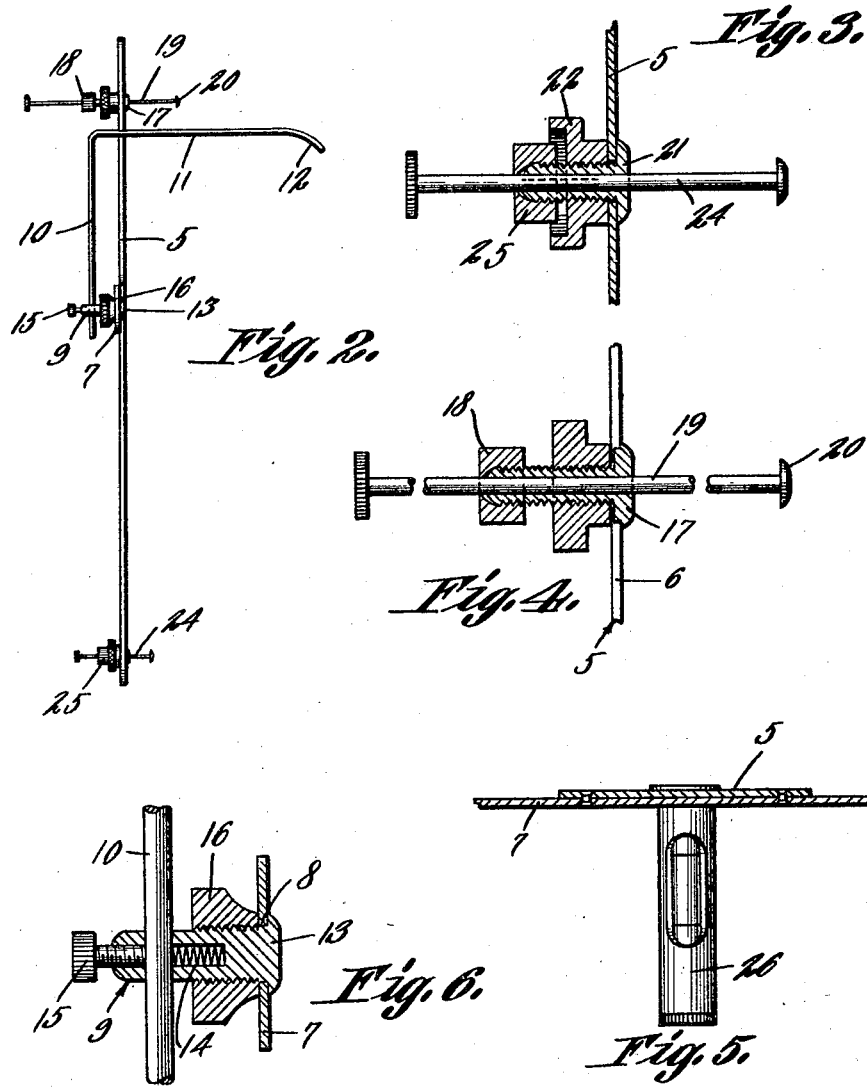

Patented May 8, 1923.

1,454,354

UNITED STATES PATENT OFFICE.

ROBERT H. VISGER, OF CHICAGO, ILLINOIS, ASSIGNOR OF THREE-FOURTHS TO OSCAR H. WALLEN, OF CHICAGO, ILLINOIS.

MEASURING DEVICE.

Application filed February 27, 1922. Serial No. 539,684.

*To all whom it may concern:*

Be it known that I, ROBERT H. VISGER, a citizen of the United States, residing at Chicago, in the county of Cook and State of Illinois, have invented a new and useful Measuring Device, of which the following is a specification.

This invention has reference to measuring devices, and more particularly to a novel form of measuring device employed by tailors to insure an accurate measuring of the body of a person and facilitate the cutting of apparel, such as coats or the like.

Another object of the invention is to provide a device of this character which may be operated by persons unfamilar with the art of measuring persons for the cutting of patterns.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 2 is a side elevational view of a measuring device embodying the features of my invention.

Figure 3 is a sectional view taken on line 3—3 of Figure 1.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Figure 7 is a rear elevational view disclosing the cross arm of the device and illustrating the connection between the cross arm and one of the securing devices associated therewith.

Figure 1:
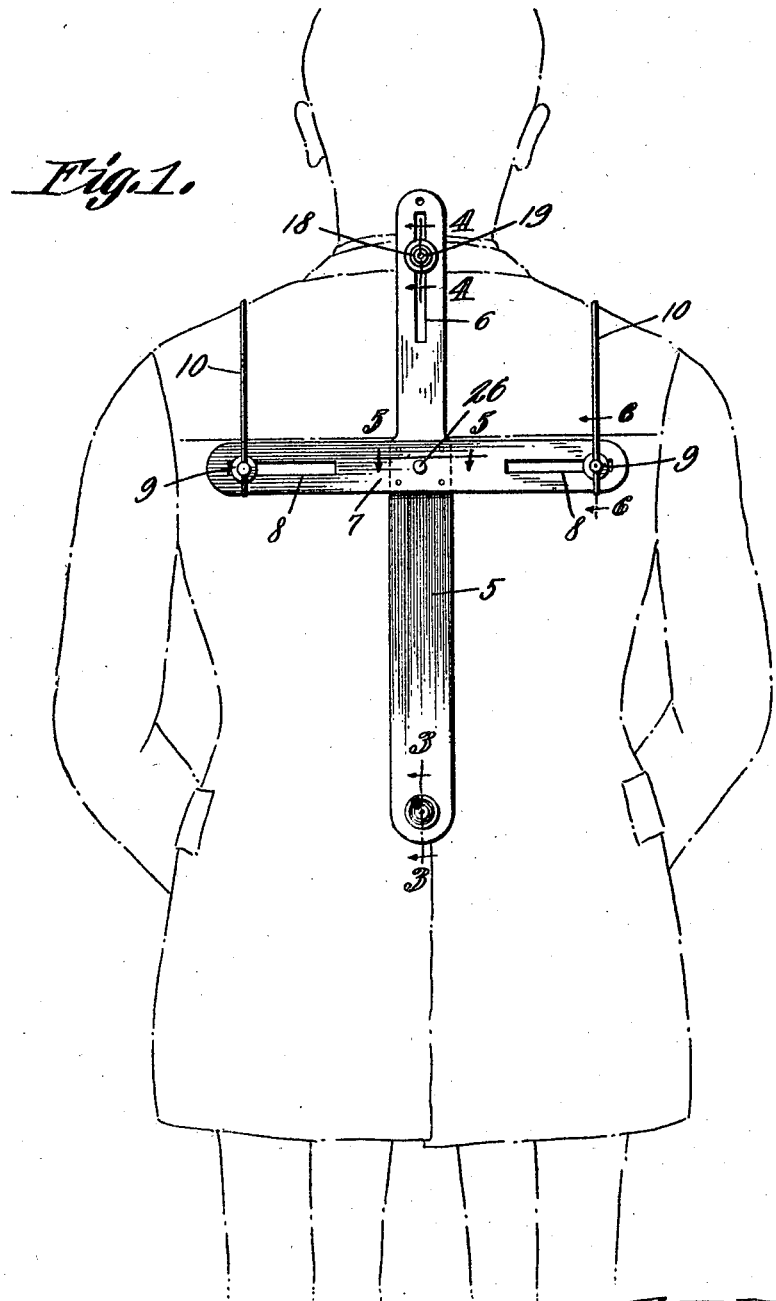
Figure 1 is an elevational view of a measuring device constructed in accordance with the present invention, and illustrating the application of the device.

Referring to the drawings in detail, the device comprises a main or body portion 5 which is formed with an elongated opening 6, disposed adjacent to the upper extremity thereof.

A cross arm 7 is secured to the main or body portion 5 at a point substantially intermediate the ends thereof, the cross arm being formed with elongated openings 8 to accommodate the securing devices 9 which are shown as supporting the arms 10. Each of these arms 10 is formed with a right angled portion 11 that has its free end curved slightly downwardly as at 12 to contact with the body of the person being measured to insure the device being held in its true measuring position.

The supports for the arms 10, are in the form of securing devices 9, each of which being formed with a head 13 contacting with one surface of the cross arm 7, the body portion of the securing devices extending through the elongated openings 8. The body portion of each securing device is formed with a bore to accommodate the coiled spring 14, which contacts with the arm 10 associated therewith, the arm 10 being shown as passing through a vertical opening formed in the securing device, where the same is engaged by the set screw 15 to secure the arm in its positions of adjustment.

Contacting with the opposite side of the cross arm 7 and cooperating with the head 13 to clamp the securing device to the arm 7 is a nut 16 which moves on the threaded portion of the securing device, and as clearly shown by Figure 6 of the drawings, contacts with one surface of the cross arm 7. Thus it will be seen that when the arms 10 have been properly positioned, the nuts 16 may be rotated to cause the securing devices 9 to be held against movement, until the measurement can be taken therefrom.

Positioned in the elongated opening 6 is a supporting device 17 which also has a head engaging the upper portion of the body portion 5 at points adjacent to the walls of the opening, the body portion of the supporting device being split to provide movable arms, the peripheries thereof being threaded to receive the threaded cap 18. Movable through the supporting device is a measuring rod 19 which has a head 20 formed on the forward end thereof, which head is designed to contact with the body of the person being measured, at a point adjacent to the upper portions of his shoulders or neck. Thus it will be seen that when the rod 19 has been properly adjusted, the cap 18 may be rotated to secure the rod in such position.

At the base of the body portion 5 is a supporting device indicated at 21 which is secured to the body portion as by means of the nut 22 which is shown as clamping the body portion 5, with the supporting device 21.

The shank or body portion of this supporting device is also split to provide arms adapted to grip the measuring rod 24 which moves through the supporting device. A threaded cap 25 being provided for moving the arms into engagement with the measuring rod 24 after the same has been properly adjusted.

To facilitate the operation of the device, a leveling means indicated at 26 is secured to the cross arm 7, at a point where the same is secured to the body portion 5, so that the leveling means will lie approximately in the centre of the persons's back being measured.

In the use of the device, to obtain a measurement for a coat, the body portion 5 is placed in a manner as shown by Figure 1 of the drawings, the arms 10 being moved to bring the cross arm 7 to a position adjacent to the upper edges of the shoulder blades of the person, it being understood that the person using the device will find the upper edges of the shoulder blades of the person being measured and draw a chalk line with a yard stick or the like, so that when the arm 7 is properly positioned, the upper edge thereof will align with the chalk line. The adjustment with the arms 10 is made in a manner to bring the upper edge of the cross arm 7 in alignment with the chalk line.

The lower measuring rod 24 is now adjusted in the small of the back of the person being measured until the leveling means moves to the center indicating that the body portion 5 is vertical. The measuring rod 19 is now moved until the head 20 thereof engages the collar of the person being measured at a point approximately the center thereof, the rod being secured in such positions of adjustment in a manner as previously described.

With these measurements, it is only necessary for the person using the measuring device to take the measurements from this instrument in the cutting of a pattern, it being of course necessary to take the chest and length of sleeve measurements in the usual manner.

It is believed that in view of the foregoing detail description, a further detail description as to the operation of the device is unnecessary.

Having thus described the invention, what is claimed as new is:—

1. A measuring device comprising an elongated body portion, a cross arm fixedly secured to the body portion, said body portion having an elongated opening disposed adjacent to the upper end thereof, said cross arm having elongated openings, vertical arms having right angled portions, means adjustably supported in the elongated openings of the cross arm for supporting the vertical arms, leveling means carried by the cross arm, and measuring rods carried by the body portion said rods being adjustable within the elongated opening of said body portion.

2. A measuring device comprising an elongated body portion, a cross arm fixedly secured to the body portion, vertically adjustable shoulder engaging arms carried by the cross arm, means for indicating when the body portion is supported in a vertical position in a plane perpendicular to the cross arm, and adjusting means embodying measuring rods carried at the ends of the body portion.

3. A measuring device comprising an elongated body portion, a cross arm fixedly secured to the body portion at a point substantially intermediate the ends thereof, leveling means carried by the cross arm, vertically adjustable shoulder engaging arms carried by the cross arm, said shoulder engaging arm adapted to be adjusted longitudinally of the cross arm, and measuring means carried by the body portion adjacent to the ends thereof.

4. A measuring device comprising an elongated body portion, a cross arm fixedly secured to the body portion, shoulder engaging arms adjustably supported by the cross arm, means for adjusting the arms longitudinally of the cross arm, means for securing the shoulder engaging arms in their positions of adjustment, and measuring rods carried at the ends of the body portion.

In testimony that I claim the foregoing as my own, I have hereto affixed my signature in the presence of two witnesses.

ROBERT H. VISGER.

Witnesses:
WILLIAM J. FITZGERALD,
FRANK E. CANTWELL.